United States Patent [19]

Hartkemeyer

[11] Patent Number: 4,684,562

[45] Date of Patent: Aug. 4, 1987

[54] MAT FOR ABSORBING OIL AND OTHER LIQUIDS

[76] Inventor: Robert Hartkemeyer, 3998 Cinti-Brkvl Rd., Hamilton, Ohio 45013

[21] Appl. No.: 713,707

[22] Filed: Mar. 19, 1985

[51] Int. Cl.$^4$ .............................................. B32B 9/06
[52] U.S. Cl. .................................... 428/182; 15/215; 15/216; 15/238; 52/98; 52/173 R; 296/38; 428/192; 428/455; 428/521; 428/537.5
[58] Field of Search ...................... 428/455, 422.8, 184, 428/192, 521, 182, 537.5; 52/98, 173 R; 15/215, 216, 238; 296/38

[56] References Cited

U.S. PATENT DOCUMENTS

| | | | |
|---|---|---|---|
| 2,975,089 | 3/1961 | Hargreaves | 428/455 |
| 3,308,009 | 3/1967 | Baumgartner, Jr. | 428/215 |
| 3,517,407 | 6/1970 | Wyant | 15/215 |
| 3,578,738 | 5/1971 | Hughes | 15/215 |
| 3,993,608 | 11/1976 | Wells | 428/422.8 |
| 4,130,685 | 12/1978 | Tarullo | 428/247 |
| 4,497,147 | 2/1985 | Clapper et al. | 52/105 |

FOREIGN PATENT DOCUMENTS 36616  9/1981  European Pat. Off. ......... 428/422.8

Primary Examiner—George F. Lesmes
Assistant Examiner—P. R. Schwartz
Attorney, Agent, or Firm—Sandler & Greenblum

[57] ABSTRACT

The present invention relates to an apparatus designed to catch drippings including three sheets, one formed from an absorbent, isotropically permeable material supported by a second sheet formed from an absorbent material for absorbing drippings. These two sheets further are supported by a third sheet that is liquid-resistant, one side of which is covered by a foil material, this foil-backed sheet further preventing liquid leakage. The three sheets are bonded together by a sealing ring, tape, or adhesive.

13 Claims, 4 Drawing Figures

MAT FOR ABSORBING OIL AND OTHER LIQUIDS

BACKGROUND OF THE INVENTION

1. Field of the Invention

The present invention relates to a mat for absorbing oil and other liquids. The mat is designed to be used primarily under motor vehicles on garage floors, but can be adapted to any situation requiring drip protection and fluid absorption.

2. Description of the Prior Art

Several mats designed to catch spilled or drip fluids are known. A disposable carpet for winter use formed of a bottom sheet of paper coated on an upper surface of a water proof material, a second layer of plastic material, and a third layer or twisted or woven kraft paper is disclosed by WYANT, U.S. Pat. No. 3,517,407. Similarly, a floormat having a water absorbent top layer for wiping feet on and an intermediate spongy layer that absorbs water, with both set in an imperforated tray, is disclosed by HUGHES, U.S. Pat. No. 3,578,738. A wall covering including a sheet of cork sandwiched between and adhesively secured to a backing material on one side and a polymerized vinyl resin material on the facing side is disclosed by TARULLO, U.S. Pat. No. 4,130,685. Finally, a vinyl-cork tile including a clear resinous protective layer on the surface of the cork and a vapor barrier and cure control film of polypropylene embedded in the body of the tile close to its back surface is disclosed by BAUMGARTNER, Jr., U.S. Pat. No. 3,308,009.

None of the prior art, however, discloses a mat comprising a top layer consisting of a fluid-permeable material, a second, intermediate layer of absorbent material, and a third or bottom layer of a foam material that is liquid-resistant, the three layers being secured together and the mat being adapted to absorb oil and other liquids.

OBJECT OF THE INVENTIONS

It is a general object of the present invention to provide a unique means for absorbing oil and other liquids, such as motor vehicle drippings in a garage.

Another object of the invention is to provide a multi-layered mat that absorbs oil and other liquids such as motor vehicle drippings in a garage in order to prevent contamination of a floor surface.

Still another object of the invention is to provide a mat that has a cover that may be satisfactorily bonded to a base without danger of the bond failing and the mat layers curling up and exposing non-absorbent surfaces.

Yet another object of the invention is to provide an inexpensively manufactured and disposable mat for absorbing oil and other liquids.

It is yet another object of the invention to provide a disposable mat constructed of layers of inexpensively produced material such as cork, cardboard, or the like with the layers sealed together or the edges of the layers bonded together.

A further object of the present invention is providing a moisture absorbent and soil retaining disposable mat having two or more layers of sheet material, the bottom material being sealed.

These and other objects of the present invention will become fully apparent to those of ordinary skill in the art from a review of the following description taking in connection with the accompanying drawings.

SUMMARY OF THE INVENTION

The present invention provides for a mat for absorbing oil and other liquids that meets the above-identified needs. The mat is formed from one or more sheets designed to catch and absorb oil and other liquids such as motor vehicle drippings. Such a mat includes a first, top sheet for absorbing oil and other liquid, a second, intermediate sheet for absorbing this oil or other liquid, in which this second sheet is disposed beneath and supports the first, top sheet, a liquid-resistant bottom sheet disposed beneath and supporting the intermediate sheet, and a means for securing these three sheets together preventing misalignment and curling up of the edges of the sheets.

In a first aspect thereof, the present invention provides for a mat for absorbing oil and other liquids that includes a permeable top sheet such as cardboard. Cardboard will absorb drippings and conduct them isotropically to the intermediate layer. The mat incorporating this intermediate layer may be constructed of an absorbent material such as cork. Cork is an excellent absorber material with many cells for collecting oil-based material such as motor vehicle drippings. This intermediate sheet is disposed underneath the permeable top sheet and supports the top sheet. A third part of the mat is a liquid-resistant bottom sheet constructed of a foam material such as polyisocyanurate in which one side is backed by a foil. The polyisocyanurate material provides an impregnable barrier that supports oil or other liquids not absorbed by the intermediate sheet. The three layers of material can be bonded together by any securing means such as tape attached to the perimeter of the layers of material or adhesive applied between the sheets.

The present invention is provided for a second aspect thereof by a three layer absorbent mat in which the means for securing the layers includes a plastic ring adapted to stretch-fit around the perimeter of the mat forcing together the three layers at the perimeter. The plastic ring can be constructed of any number of materials such as vinyl, rubber, or neopreme.

BRIEF DESCRIPTION OF THE DRAWINGS

The above and other objects, features, and advantages of the present invention will become more fully apparent to one of ordinary skill in the art to which the invention pertains from a detailed review of the drawings in which like reference numbers are used to identify similar parts throughout, and wherein.

DETAILED DESCRIPTION OF THE PREFERRED EMBODIMENTS

Figure 1:
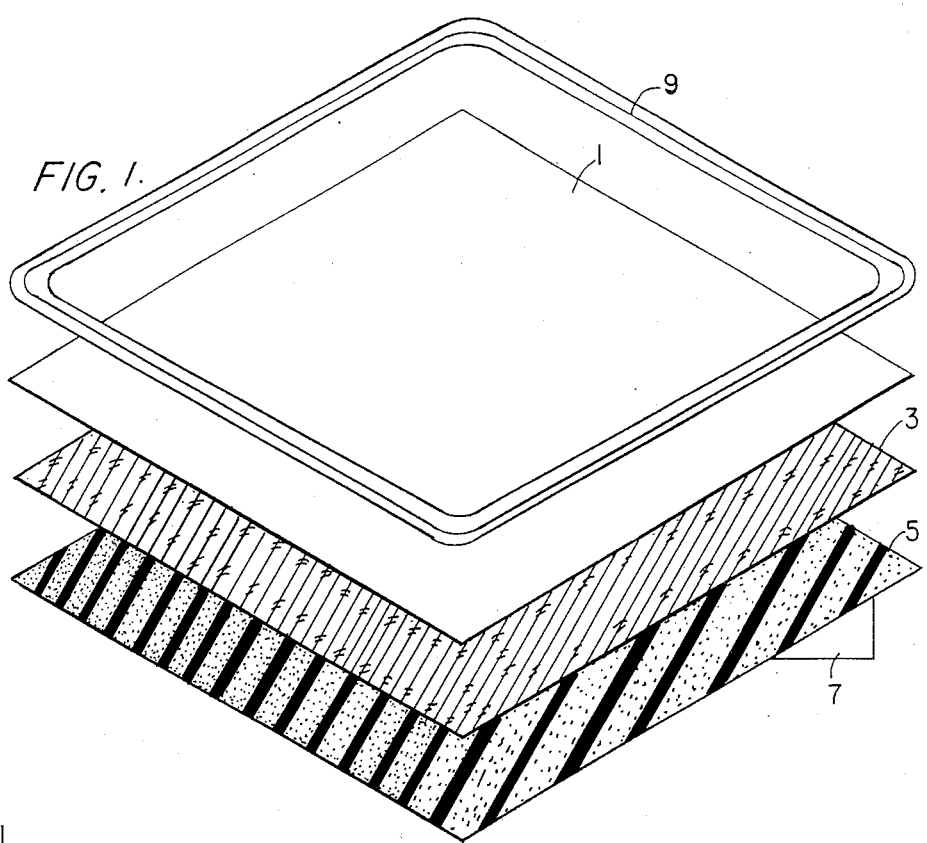
FIG. 1 is an exploded perspective view of a mat for absorbing oil and other liquids.

The present invention will now be described in detail with more specific reference to the drawings. As illustrated in FIG. 1, the mat is shown as being comprised of a first, top sheet 1; a second, intermediate sheet 3; and a third, bottom sheet 5, with one side of the bottom sheet being backed by a foil material 7. A sealing ring 9 serves to compress these sheets together to form a single bonded mat.

Top layer 1 is a generally absorbent, isotropically permeable material such as cardboard. This first layer could equally well comprise any material that is liquid absorbent and permeable.

Intermediate sheet 3 is positioned below and supports sheet 1 and is positioned above and is supported by bottom sheet 5. Sheet 3 comprises a liquid absorbent material such as cork. This intermediate layer serves to absorb liquid such as oil that has traversed through top layer 1 so that further contamination is minimized or prevented. The cork layer is thicker than the top sheet 1 to increase both the resiliency and strength of the laminated mat.

As further illustrated in FIG. 1, third layer 5 comprises any material that is resistant to liquid. A foam material such as polyisocyanurate provides a suitable support for the top two layers while isolating any drippings that may traverse the intermediate absorbent material and thereafter become pooled at the junction between layers 3 and 5. Layer 5 is further protected by a foil material 7 on the bottom or underside of sheet 5 that further serves to prevent the leakage of any liquid that may permeate through crevices or interstices in foam material 5.

Figure 2:
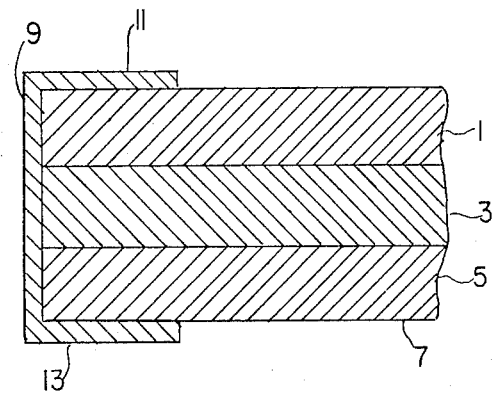
FIG. 2 is a cross-sectional view of the mat of FIG. 1 taken along line 1—1.
Figure 4:
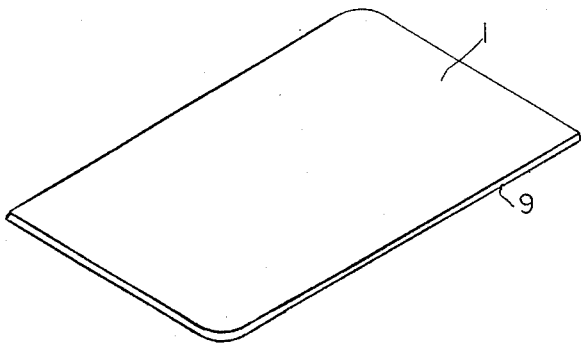
FIG. 4 is a perspective view of the assembled mat of FIG. 1.

As seen in cross-section in FIG. 2, layers 1, 3, 5, and 7 are aligned together and stacked, and subsequently are bonded in this position by a sealing ring 9. Sealing ring 9 serves to press together the edges of sheets 1, 3, and 5 (backed by foil layer 7) along their peripheral edges. A recess can be formed in sealing ring 9 by top 11 and bottom 13 to receive the three layers to hold them securely between components 11 and 13. Sealing ring 9 presses together the mat layers so that curling of the mat edges is avoided and alignment among the sheets is preserved. Sealing ring 9 can be constructed from rubber, vinyl, or neoprene that is stretched-fit or shrunk-fit about the perimeter of the mat.

Figure 3:
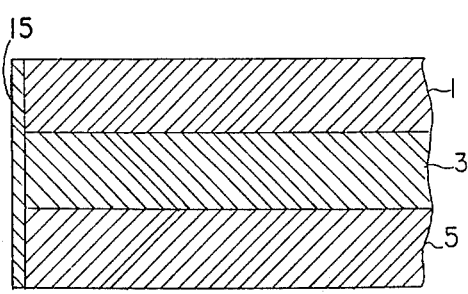
FIG. 3 is a cross-sectional view of the mat in which a different means to secure the layers together is shown.

As shown in FIG. 3, layers 1, 3, 5 and 7 are aligned together and stacked, and subsequently are bonded in this position by adhesive tape 15. Adhesive tap 15 holds together the mat at the perimeter so that misalignment is prevented.

This mat can be positioned on the floor of a garage beneath a motor vehicle so that oil, antifreeze, or brake fluid drippings will be caught by top sheet 1 and conducted to intermediate sheet 3 that serves to absorb the drippings. The mat also can be used under other leaking vehicles, e.g., trucks, lawnmowers, buses, boats, and motor cycles, to minimize the tracking of oil into areas where such is not desirable.

In another, non-illustrated embodiment of the present invention, the mat can be used to absorb drippings in any other situation such as on a kitchen floor where gravies or other liquid food materials may fall.

It is clear from the above description that other embodiments, features, and characteristics of the present invention will be well within the skill of the art of those of ordinary skill in the art to which this invention pertains, and that such features and advantages are considered to be within the scope of the present invention.

What is claimed is:

1. A mat for absorbing oil and other liquids comprising:
   (a) a first, top sheet for absorbing said oil and other liquid, said top sheet comprising cardboard material;
   (b) a second, intermediate sheet for absorbing said oil and other liquid, said second sheet being disposed beneath and supporting said top sheet;
   (c) a liquid resistant bottom sheet, said bottom sheet being disposed beneath said intermediate sheet and supporting said intermediate sheet; and
   (d) means for securing said top sheet, said intermediate sheet, and said bottom sheet together, wherein said securing means prevents misalignment of said sheets and surrounds the perimeter of said mat defined by the respective edges of said top sheet, said intermediate sheet and said bottom sheet.

2. A mat defined by claim 1 wherein said cardboard top sheet comprises an isotropically, permeable material for absorbing said oil and other liquids.

3. A mat defined by claim 1 wherein said intermediate sheet comprises cork.

4. A mat defined by claim 1 wherein said bottom sheet comprises a foam board having a top side and a bottom side.

5. A mat defined by claim 4 wherein said bottom side of said bottom sheet has attached to it a liquid-resistant material.

6. A mat defined by claim 5 wherein said liquid-resistant material comprises foil.

7. A mat defined by claim 4 wherein said foam board comprises polyisocyanurate.

8. A mat defined by claim 1 wherein said top sheet, said intermediate sheet and said bottom sheet, when aligned together define a perimeter along their edges.

9. A mat defined by claim 8 wherein said means for securing said sheets comprises a sealing ring elastically positioned about said perimeter of said mat.

10. A mat defined by claim 9 wherein said sealing ring is made from a material selected from a group consisting of vinyl, rubber, and neopreme.

11. A mat for absorbing oil and other liquid comprising a first, top sheet comprising cardboard for absorbing said oil and other liquids; a second, intermediate sheet comprising cork for absorbing oil and other liquids; a liquid-resistant, bottom sheet comprising foil-backed polyisocyanurate material, and a means for securing said top sheet, said intermediate sheet, and said bottom sheet together, said sheets, when aligned together, comprising a perimeter at the edges of said sheet, comprising a plastic ring elastically positioned about said perimeter of said mat, said plastic ring made from materials selected from the group consisting of vinyl, rubber, or neopreme, wherein said intermediate sheet is disposed between said top sheet and said bottom sheet, and said bottom sheet supports said intermediate sheet, and said intermediate sheet supports said top sheet.

12. A mat defined by claim 11 wherein said means for securing said top sheet, said intermediate sheet, and said bottom sheet together comprises tape.

13. A mat for absorbing oil and other liquids comprising a first, top sheet comprising cardboard for absorbing said oil and other liquids; a second, intermediate sheet for absorbing oil and other liquids; and a liquid-resistant bottom sheet comprising foil-backed plastic material said intermediate sheet and said bottom foil sheet being adhesively attached to each other, and means for attaching said top sheet, said intermediate sheet, and said bottom sheet together, wherein said sheets, when aligned, together define a perimeter about the edges of said sheets, said securing means comprising a plastic ring positioned about said mat perimeter said intermediate sheet being disposed between said top sheet and said bottom sheet, wherein said bottom sheet comprises a support for said intermediate sheet and said intermediate sheet comprises a support for said top sheet.

* * * * *

UNITED STATES PATENT AND TRADEMARK OFFICE
CERTIFICATE OF CORRECTION

PATENT NO. : 4,684,562

DATED : August 4, 1987

INVENTOR(S) : Robert HARTKEMEYER

It is certified that error appears in the above-identified patent and that said Letters Patent is hereby corrected as shown below:

At column 4, line 13, the "," after "isotropically" should be deleted.

Signed and Sealed this

Thirty-first Day of January, 1989

Attest:

DONALD J. QUIGG

Attesting Officer

Commissioner of Patents and Trademarks